(No Model.)

J. O. BROWN.
VELOCIPEDE.

No. 256,118.  Patented Apr. 11, 1882.

2 Sheets—Sheet 1.

Attests.

Inventor
James O. Brown
By his atty (No Model.)  J. O. BROWN.  2 Sheets—Sheet 2.

VELOCIPEDE.

No. 256,118.  Patented Apr. 11, 1882.

Attests

Inventor
James O. Brown
By his atty

UNITED STATES PATENT OFFICE.

JAMES O. BROWN, OF BANGOR, MAINE.

VELOCIPEDE.

SPECIFICATION forming part of Letters Patent No. 256,118, dated April 11, 1882.

Application filed October 5, 1881. (No model.)

*To all whom it may concern:*

Be it known that I, JAMES O. BROWN, of the city of Bangor, in the county of Penobscot and State of Maine, have invented an Improvement in Velocipedes, of which the following is a specification.

My invention has reference to velocipedes generally, but more particularly to that class which have more than two wheels; and it consists of two large forward wheels upon independent axles, to one only of which propelling-power is applied, and two small trailing-wheels adapted to run upon the ground between the two large wheels and tolerably close to their line of contact with the ground; further, in hinging said trailing-wheels to the frame at a point in advance of their axes and combining them with means to govern and control their movement, to the end that they may steer the velocipede; further, in combining the steering device with brake devices adapted to act upon each of the two forward wheels and their axles independently; further, in arranging the seat close to the main axles, between the wheels and somewhat to the rear of their axes; further, in so constructing the axle-frame that the two independent axles may be so set that the large wheels will have an angle the focus of which might be anywhere from below to in front of the machine; further, securing to one of the main shafts a sprocket-wheel and arranging below and somewhat in advance a second sprocket-wheel upon the crank-axle, and supported in adjustable bearings, and an endless chain working over both of said wheels, or other equivalent device, and in minor details of construction, all of which are more fully set forth in the following specification and shown in the accompanying drawings, which form part thereof.

Figure 1:
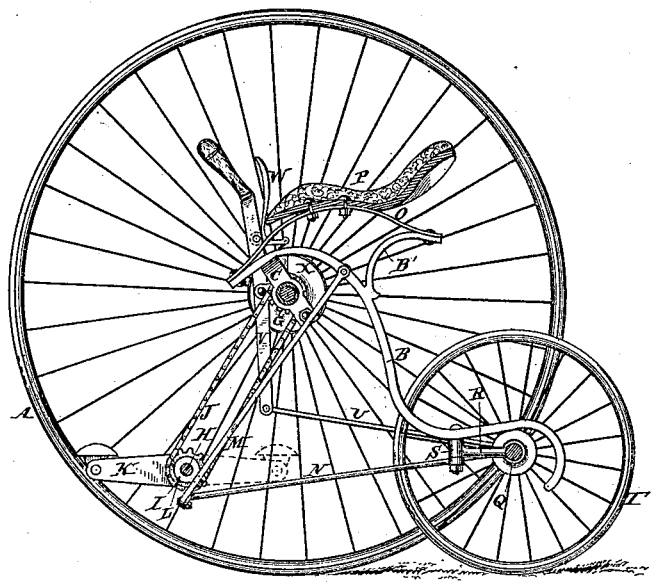
Figure 2:
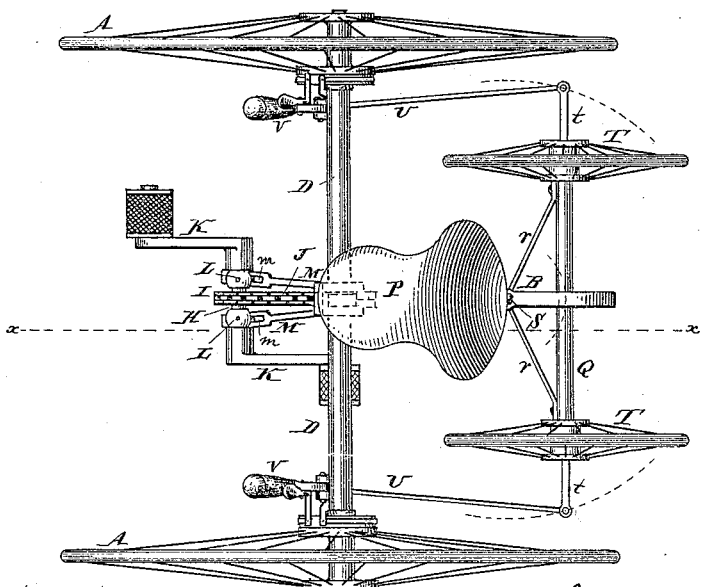
Figure 3:
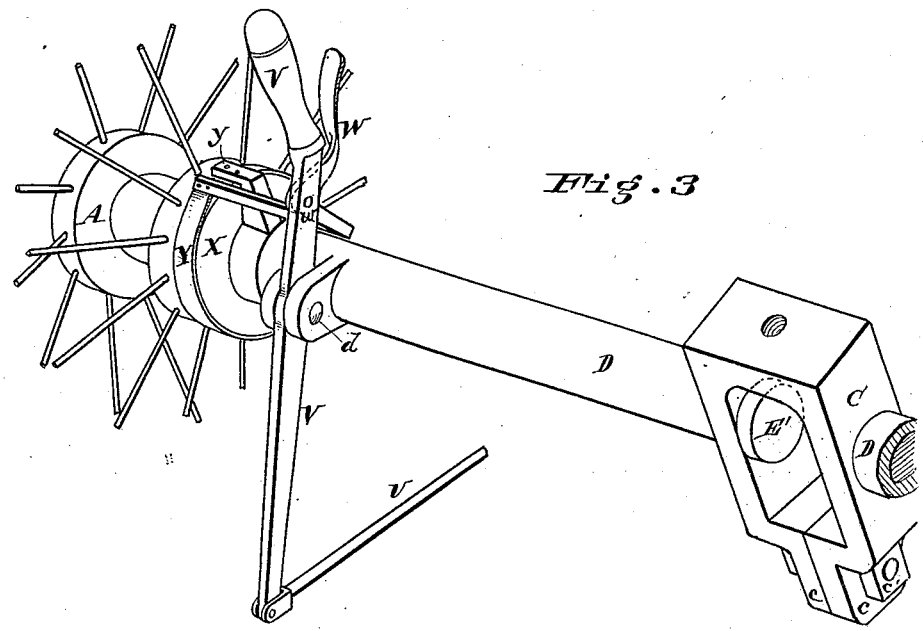
Figure 4:
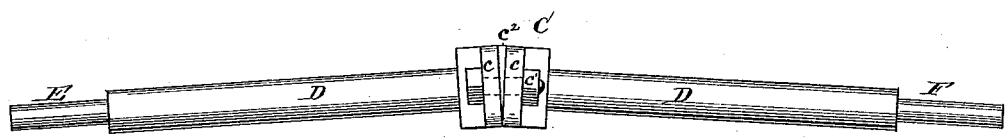
Figure 5:
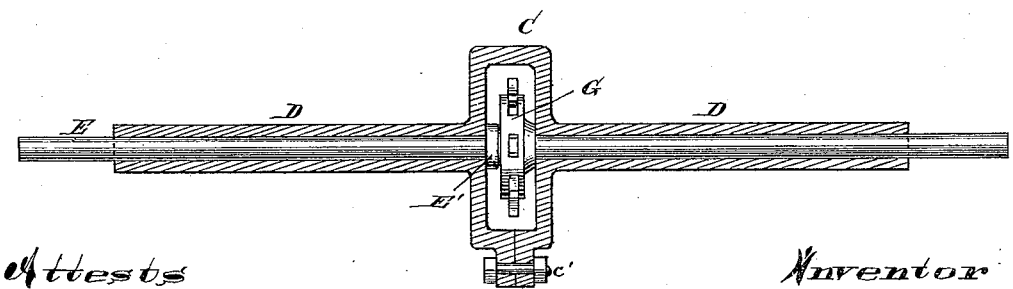

The object of this invention is to construct a velocipede which can be ridden by both the male and female sex with equal facility, that shall be steered as a horse would be governed by the reins, that shall be adapted to turn in a very limited space, that shall be so constructed that it may be stopped instantly, that the wheels may be set at any desired angle, and that cannot upset the rider.
In the drawings, Figure 1 is a sectional side elevation on line *x x* of a velocipede embodying in it my improvements. Fig. 2 is a plan of same. Fig. 3 is a perspective view, showing the axle-frame, one of the main axles, the steering device, and brake device. Fig. 4 is a view from below of the axle-frame and axles, and shows one method of giving an angular run to the wheels. Fig. 5 is a sectional elevation of the axle-frame, and shows the two independent axles and the sprocket-wheel in elevation.

A A are the main wheels, one of which is secured to the idler-shaft E, having its bearings in the axle-frame D, and provided with a collar or head, E', to keep it in place. The other of said wheels is secured upon the driving-shaft F, having its bearings also in the axle-frame D, and carrying on its inner end a chain or sprocket-wheel, G, which rests against the collar E' of shaft E and works within an □- shaped frame, C, which joins the two parts of frame D, said frame C being split at the bottom, forming lugs *c c*, which are bolted together by bolt *c'*.

Secured to the frame C, and extending back, is the frame B, which is provided with an arm, B', upon which and the end of the frame B the spring O, which supports the seat P, rests.

The axle Q carries the idler trailing or steering wheels T, and is provided with an extension, R, secured from lateral strain by braces *r*, which is pivoted to frame B at S, some few inches in advance of the axles of the trailing-wheels, to keep said wheels in line when the steering device is not used.

The braces M and N support the axle H, which carries the sprocket or chain wheel I and cranks K, said axle being carried in bearings L, made adjustable in braces M by means of slots *m*.

Passing over wheels I and G is an endless sprocket-chain, J.

Pivoted at *d* to the axle-frame D, and close to either wheel A, is the steering-lever V, provided at the top with a handle and pivoted at the bottom to a rod, U, which in turn is pivoted to an extension, *t*, of the axle Q.

The brake-lever or bell-crank W is either pivoted to the lever V at *w*, as shown, or directly to the frame D, and to one end of said lever W is secured a brake-strap, Y, which encircles the wheel face or hub X on the wheel A, said strap being secured at the other end to the lug y on the frame D. One of these brakes is preferably arranged to act upon each wheel.

In operating the machine the operator sits upon the seat P and places his feet upon the cranks K, and upon rotating the wheel I the chain J transmits a like motion to wheel G and shaft F, rotating the driving-wheel A and propelling the machine. To steer either to one side or the other, the operator pulls upon the respective steering-levers V, which action swings the trailing axle and wheels T into the proper position to steer the velocipede as desired.

To turn on the driving-wheel A as if on a pivot, suddenly press hard upon the brake-lever W, which governs the rotation of shaft F, at the same time holding the cranks rigid with the feet and leaning the body forward, so as to balance the machine, when the velocipede will rotate upon the wheels A, the driver acting as the pivot or axis of rotation.

By joining the bearings of the frame D by the split frame C the axles and wheels may be set at an angle, as shown in Fig. 4, by inserting a small wedge-shaped piece, $C^2$; or the same effect may be obtained by leveling off the edges of said lugs c c, and thereby give any angle to the wheels A, whose focus or point of intersection will be preferably from below to before the machine, but which may be any distant point in a plane passed through the middle points of the axle Q and from D C.

Having now described my invention, what I claim as new, and desire to secure by Letters Patent, is—

1. A velocipede in which the two large wheels are secured upon independent axles, and one of said wheels alone acts as the propeller to the vehicle, substantially as and for the purpose specified.

2. A velocipede in which the two large wheels are secured upon independent axles, and one of said axles arranged and combined with means wherewith it can be rotated to propel the velocipede, substantially as and for the purpose specified.

3. In a velocipede, the axle-frame consisting of the two bearings D D, joined in the middle by a yoke or frame, C, one side of which is split, in combination with a bolt, whereby said bearings may be set at various angles, substantially as and for the purpose specified.

4. In a velocipede, the combination of frame D C, wheels A A, one of which is upon a shaft, E, and the other upon shaft F, provided on its inner end with a wheel, G, seat P, frames B M N, or their equivalent, crank-axle H, cranks K, adjustable bearings L, wheel I, and chain J, or its equivalent, steering-levers V, rod U, axle Q, arms t, steering-wheels T, projection R from axle Q, and pivot S, substantially as and for the purpose specified.

5. In a velocipede, the wheels A upon independent axles and provided with brake-wheels X, in combination with brake-levers W, frame D, with its lug y, and brake-strap Y, substantially as and for the purpose specified.

In testimony of which invention I hereunto set my hand.

JAMES O. BROWN.

Witnesses:
LOUIS J. MÁTOS,
WM. R. NICHOLSON.